United States Patent Office 3,676,205
Patented July 11, 1972

3,676,205
TEXTILE TREATMENT WITH AMPHOTERIC STARCH
Lee H. Elizer, Keokuk, Iowa, assignor to The Hubinger Company, Keokuk, Iowa
No Drawing. Continuation-in-part of applications Ser. No. 597,561, Nov. 29, 1966, and Ser. No. 816,100, Apr. 14, 1969, now Patent No. 3,622,563, dated Nov. 23, 1971. This application Feb. 13, 1970, Ser. No. 11,300
Int. Cl. C08j 1/44; D06m 15/16
U.S. Cl. 117—139.5 C                                   8 Claims

ABSTRACT OF THE DISCLOSURE

Amphoteric starch which contains both cationic and anionic groups linked to the starch molecule is used in the textile industry, especially for sizing mixed fibers in the form of threads or yarns such as, for example, mixtures of polyester fibers and cotton fibers. The amphoteric starch has an isoelectric pH and can be dyed with acid dyes at a pH below the isoelectric pH and with basic dyes at a pH above the isoelectric pH. It can therefore be used to alter the dyeing properties of material to which it is applied.

This application is a continuation-in-part of U.S. application Ser. No. 597,561 filed Nov. 29, 1966, now abandoned, and Ser. No. 816,100 filed Apr. 14, 1969, issued as U.S. Pat. 3,622,563 on Nov. 23, 1971, and covers subject matter which was required to be divided from said applications.

It is well known that starches are useful in sizing cotton fibers and for a wide variety of other industrial purposes. In recent years many synthetic fibers have become available and it has been difficult to find relatively inexpensive sizing compositions which are suitable for sizing a wide variety of these fibers, including mixtures of cotton and synthetic fibers. In particular, it has been difficult to provide suitable low cost sizing compositions for mixtures of polyester fibers (e.g., Dacron) and cotton. In common practice, the fibers are sized in the form of threads or yarns prior to weaving. The sized threads or yarns are then woven into cloth and thereafter the sizing material is removed by washing with water containing detergent or by treatment with enzymes. A satisfactory sizing composition is one which will provide suitable lubrication and resistance during weaving and at the same time can be readily removed thereafter.

One of the objects of the present invention is to provide a new and improved process of textile treatment.

Another object is to provide new and improved textile materials. Other objects will appear hereinafter.

In accordance with the invention, a starch is prepared in the form of ungelatinized starch granules which contain both cationic and anionic groups. These new and improved starch products are prepared by reacting ungelatinized starch with a nitrogen-containing etherifying agent to introduce a cationic group into the starch molecule, for example, one containing a tertiary amino, tertiary amine salt, quaternary amino, quaternary amine salt, and/or a cyanamide radical, and also with a reagent capable of introducing an anionic group into the starch molecule, for example, one containing a sulfonic, sulfonate, carboxylic, carboxylate, phosphate or phosphonate radical.

Preferred nitrogen-containing etherifying agents are 2-chloroethyldiethylamine hydrochloride, also called 2-chlorotriethylamine hydrochloride, and 4-chloro-2-butenyltrimethyl ammonium chloride having Formulas I and II, respectively, as follows:

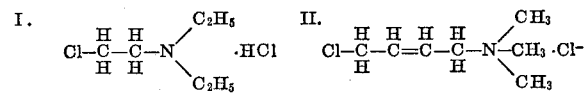

Preferred reagents for introducing anionic groups into the starch molecule are propane sultone and sodium chloroacetate having Formulas III and IV, respectively, as follows:

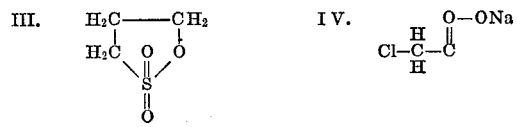

The reaction with the ungelatinized starch can be carried out either sequentially or simultaneously. Thus, the 2-chloroethyl diethylamine hydrochloride or 4-chloro-2-butenyltrimethyl ammonium chloride can be reacted with the starch first, followed by the addition of the propane sultone or sodium chloroacetate, or the propane sultone or sodium chloroacetate can be reacted with the starch, followed by the addition of the 2-chlorotriethylamine hydrochloride, or 4-chloro-2-butenyltrimethyl ammonium chloride, or the 2-chloroethyldiethylamine hydrochloride and/or 4-chloro-2-butenyl trimethyl ammonium chloride and the propane sultone and/or sodium chloroacetate can be mixed together in water to form a clear solution before stirring the mixture with a starch slurry.

The basic amino groups are preferably introduced into the starch molecule by using as one of the reactants a tertiary amine or amine salt containing a reactive group linked to a hydrocarbon group of the amine. The hydrocarbon group or groups of the amine can be alkyl (e.g., methyl, ethyl, propyl, isopropyl, butyl, isobutyl), aryl (e.g., phenyl, tolyl), aralkyl (e.g., benzyl), or cycloalkphatic (e.g., cyclopentyl, cyclohexyl, or cycloheptyl). The amine can be a monoamine or a polyamine but is preferably a monoamine. It can also be a heterocyclic amine (e.g., piperidine, pyridine). In general, however, from the standpoint of ease of carrying out the reaction and of desirable properties in the resultant products, it is preferred to use a water soluble amine. The reactive groups of the amine are preferably either halogen (e.g., chloro-, bromo-, etc.) or epoxy. The portion of the amine to which the reactive group is attached is acyclic. The reactive group is preferably separated from a nitrogen atom of the amine by at least one carbon atom, usually 2 to 6 carbon atoms.

The resultant products may be described by the following structural formula:

(V) 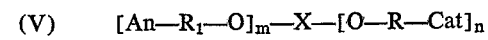

wherein X is starch, An is an anionic group, e.g., carboxylic, carboxylate, sulfonic, sulfonate, phosphate, phosphonate, or other anionic group, Cat is cationic group, e.g., tertiary amino, or quaternary, or other amine or amine salt, R and $R_1$ are divalent acyclic hydrocarbon or hydroxyhydrocarbon groups having 1 to 6 carbon atoms, and $m$ and $n$ represent the number of times these radicals occur, usually a minimum of 0.5 each per 100 anhydroglucose units and a total of $m+n$ not exceeding 16.

A preferred group of products is represented by the following general formula:

VI.     $[YO-Z-R_1-O]_m-X-[O-R-\underset{|}{N}-R_3]_n$
                                                                $R_2$ where X is starch, R and $R_1$ are divalent acyclic hydrocarbon or hydroxyhydrocarbon groups preferably having 1 to 6 carbon atoms and more specifically 1 to 4 carbon atoms; $R_2$ and $R_3$ are hydrocarbon, preferably alkyl having 1 to 6 carbon atoms and more specifically 1 to 4 carbon atoms;

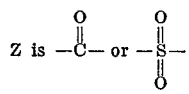

Y is hydrogen or a salt forming radical, e.g., sodium, potassium, calcium, ammonium, and m and n are numerical values representing the number of times the anionic and cationic radicals, respectively, occur in the molecule, usually 2 to 6, and a total ordinarily not exceeding 10.

The starch molecule is usually considered to consist of a number of anhydroglucose units (AGU) each having a molecular weight of 162.14. Each AGU has three reactive hydroxyls but one of these reacts more readily than the others. Hence, one simple type of molecule of a typical amphoteric starch of the invention can be represented by the following structures:

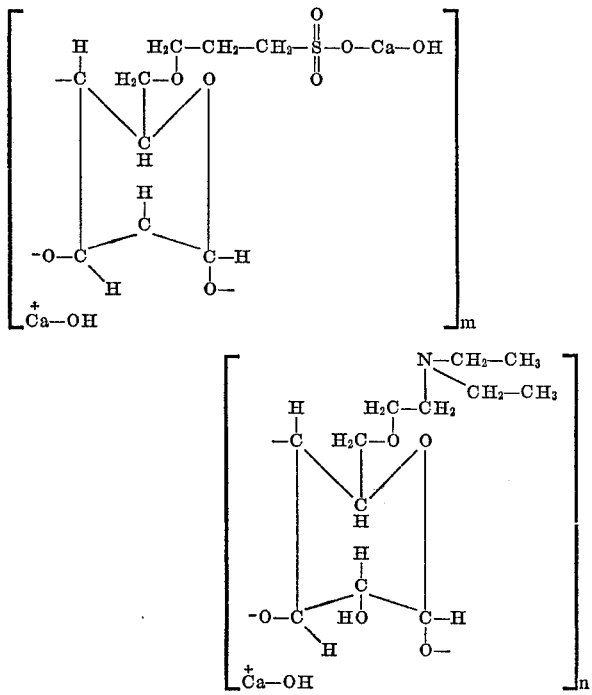

The term "starch" when used herein refers to ungelatinized starch which can be natural starch or a modified starch containing reactive hydroxyl groups. Among the modified starches which are useful are thin boiling starches prepared by slurrying corn starch in water acidified to 0.1 N with HCl for 10 to 20 hours at temperatures below gelatinization temperatures. High amylose starches can also be used. The starch can be of any origin, for example, corn, wheat, potato, waxy corn, tapioca, sago or rice.

Sultones are intramolecular cyclic esters of hydroxysulfonic acids and may be derived both from aliphatic and from aromatic sulfonic acids. Examples of sultones suitable for the present purpose are 1,3-propanesultone, 1,4-butanesultone, mixtures of isomeric butanesultones (which may be prepared from mixtures of chlorobutanesulfonic acids, obtained by sulfochlorination of 1-chlorobutane), benzylsultone and tolylsultone.

Sodium chloroacetate is the sodium salt of monochloroacetic acid. The free acid can be used but since the reaction is carried out under alkaline conditions it will be converted to a salt. Other reactive halogen aliphatic acids and their salts (e.g., Na, K, Ca) containing two to six carbon atoms can be used, for example, monobromoacetic acid and its sodium salt, and monochloropropionic acid and its salts.

Examples of amine etherifying agents suitable for the practice of the invention are:

2-chloroethyldiethylamine;
2-chloroethyldiethylamine hydrochloride;
2-chloroethyldimethylamine;
2-chloroethyldimethylamine hydrochloride;
3-chloropropyldiethylamine;
3-chloropropyldiethylamine hydrochloride;
3-chloropropyldimethylamine;
3-chloropropyldimethylamine hydrochloride;
4-chlorobutyldiethylamine;
4-chlorobutyldiethylamine hydrochloride;
2-chloroisopropyldimethylamine;
2-hydroxy-3-chloropropyltrimethylamine chloride;
3-dibutylamino-1,2-epoxypropane;
2-bromo-5-diethylaminopentane hydrobromide;
N-(2,3-epoxypropyl) piperidine, and N,N-(2,3-epoxypropyl)methyl aniline. In general, it is preferable to use the salts of the amine esterifying agents, such as, for example, the hydrochlorides and the hydrobromides. Mixtures of amine etherifying agents can be employed. The salts should be selected so as to avoid formation of precipitates. For example, if calcium, strontium or barium is present, sulfates or phosphates should not be used because insoluble salts such as calcium sulfate or calcium phosphate would form. However, sulfates or phosphates can be used where sodium, potassium or lithium ions are present.

The reagents for introducing anionic and cationic groups both act as etherifying agents for starch under basic conditions. The reaction can be carried out at ordinary or slightly elevated temperatures below the temperature at which the starch gelatinizes, for example, within the range of 35° F. to 130° F. In order to obtain uniform reaction, it is desirable to mix the reactants with a solvent, preferably water. Other solvents can be used but they are more expensive and in some cases present problems in recovering the product. The product is insoluble in water and therefore can be recovered by filtration, washing with water and drying.

The invention will be further illustrated but is not limited by the following examples in which the quantities are stated in parts by weight unless otherwise indicated.

EXAMPLE I

A slurry of 5000 grams of No. 50 thin boiling regular corn starch in 5 liters of water was prepared. A slurry of 168 grams (3 moles) of calcium oxide made up to one liter with water and cooled to ambient temperature was stirred into the starch slurry and the resultant mixture diluted to 10 liters with water.

To the resultant slurry was added 183.2 grams of propane sultone and after mixing the sultone with the starch slurry for 4 hours at the ambient temperature (about 88° F.), 258 grams of 2-chloroethyldiethylamine hydrochloride in one liter of water was stirred into the slurry at the ambient temperature of about 80° F.

After 18 hours the pH was adjusted to 6.0 by adding 6 N hydrochloric acid. The resultant product was then divided into 2 equal portions. The first portion was filtered, reslurried with water to 5 liters, filtered again, reslurried with water to 5 liters, filtered a third time, reslurried with water to 5 liters, filtered again and dried.

The second portion was adjusted to a pH of 1.0 by adding 6 N hydrochloric acid and a dry product was recovered in the same manner as for the first portion.

100 grams of the second portion was slurried in distilled water and diluted to one liter. After 5 minutes the pH was 4.0. Then 100 cc. of slurry was removed, filtered, air dried and labelled. The pH was adjusted to 5.0 with saturated sodium carbonate solution. After 5 minutes 100 cc. of this slurry was removed, filtered, air dried and labelled. The above process was continued in steps of 0.5 pH unit to pH 10.5. A portion of each product was slurried in 2 different solutions, one solution being a 0.0001 molar aqueous solution of Light Green SF yellowish dye (Color Index No. 42095), and the other solution containing the same amount of Methylene Blue basic dye (Color Index No. 52015).

The granules of the product accepted the acid dye (CI No. 42095) from pH 4.0 through pH 6.0. No dyeing took place at pH 7. The granules also accepted the basic dye from pH 10.5 through 7.0. They did not dye at pH 6. It is therefore believed that the isoelectric point must be between 6 and 7.

The foregoing products contained about three propyl sulfonic acid groups per 100 anhydroglucose units and about 3.7 basic amino groups per 100 anhydroglucose units.

An aqueous paste of these products prepared at the isoelectric point was effective in sizing a multifiber test fabric containing cellulose acetate, Acrilan 1656 (acrylic fiber), Arnel (cellulose acetate fiber), cotton, Creslan 61 (acrylic fiber), Dacron 54 (polyester fiber), Dacron 64 (polyester fiber), nylon 66 (polyamide fiber), Orlon 75 (acrylic fiber), silk, Verel A (modified acrylic fiber), Viscose (regenerated cellulose) and wool.

EXAMPLE II

A slurry was prepared consisting of 5000 grams of dry No. 50 thin boiling regular corn starch in 5 liters of water. 56 grams of calcium oxide diluted to one liter with water was poured into the starch slurry and the whole mixture diluted with water to 10 liters. This mixture had a pH of 11.5 at 82° F. 61.1 grams of propane sultone was added to the starch slurry and reacted at 82° F. for 4 hours. 86 grams of 2-chloroethyldiethylamine hydrochloride in one liter of water at 80° F. was stirred into the slurry and the resultant mixture was reacted at 78° F. for 18 hours. It was divided into two equal portions.

In the first portion the pH was adjusted to 1.0 with 6 N hydrochloric acid at a temperature of 80° F. The slurry was filtered, the residue reslurried in 5 liters of water, filtered, reslurried again in 5 liters of water, filtered, reslurried again in 5 liters of water, filtered and dried.

The second portion of the slurry was adjusted to pH 7.0 with 6 N hydrochloric acid at a temperature of 80° F. and a dry product was recovered in the same manner as with the first portion.

Both products contained about 1.7 basic amino groups per 100 anhydroglucose units. Both products also contained approximately one propyl sulfonic acid group per 100 anhydroglucose units.

Samples of these products adjusted to various pH's were dyed with an acid dye Light Green SF yellowish (CI 42095) and also with a basic dye Methylene Blue (CI 52015). The products accepted the acid dye at a pH of 1 to 4 and the basic dye at a pH of 6.5 to 10. The isoelectric point was therefore determined to be between pH and 6.5.

In Examples I and II the number 50 thin boiling regular corn starch is prepared in a conventional manner by mixing 60,000 pounds of dry corn starch in a 20 Bé. slurry with hydrochloric acid to make about a 0.1 N solution. The temperature is adjusted to 125° F. and the mixture is allowed to undergo reaction at this temperature until the No. 50 fluidity point is reached. To determine this point, 5 grams of dry starch slurried in water is neutralized and washed and slurried in 90 cc. of 0.1 N sodium hydroxide. After a predetermined time, under refrigeration, the mixture is poured through a standard funnel. The fluidity is the number of cc. that passes through the funnel in one minute. For unmodified starch only one cc. can be collected in one minute. For a No. 50 thin boiling starch 50 cc. can be collected in one minute.

EXAMPLE III 5000 grams of No. 50 thin boiling regular corn starch containing 30.8 AGU was slurried in 5 liters of water and then diluted to 10 liters at the ambient temperature of 80° F. 2 liters of the slurry were removed and allowed to stand for 23 hours at an ambient temperature of 74° F. The pH was determined to be 5.5. It was adjusted to 7 by adding 0.1 N sodium hydroxide. The starch was then filtered, reslurried in 2 liters of water, filtered, reslurried again in 2 liters of water, filtered, reslurried in 1 liter of distilled water, filtered and dried. This product was labelled 37.1–26.

90 grams of calcium oxide was slurried in 200 cc. of water diluted to 400 cc. and stirred into the remainder of the original starch slurry. 2100 cc. of this product was removed and allowed to stand for 23 hours at 86° F. It was determined to have a pH of 11.8. The pH was adjusted to 7.0 by adding 6 N hydrochloric acid. The product was then filtered, reslurried in 2 liters of water, filtered, reslurried again in 2 liters of water, filtered, reslurried in 1 liter of distilled water, filtered and dried. This product was labelled 37.2–26.

To 2100 cc. of the original starch slurry, 34.4 grams of 2-chloroethyldiethylamine hydrochloride was added and the mixture reacted 22 hours at 84° F. The pH was determined to be 11.3 at 74° F. at the end of this period. This was adjusted to pH 7.0 by adding 6.0 N hydrochloric acid and the product was recovered in the same manner as with 37.1–26 and 37.2–26. This product was labelled 37.3–26.

To the remaining 4200 cc. of the original slurry, 48.9 grams of propane sultone was added and the reaction was allowed to proceed for 4 hours at 80–83° F. 2100 cc. of the resultant product was removed and allowed to stand for 18 hours at 75° F. The pH was determined to be 11.6. The pH was adjusted to 7.0 by adding 6 N hydrochloric acid and a dry product was recovered as described in 37.1–26 and 37.2–26. The resultant product was labelled 37.4–26.

To the remaining 2100 cc. of starch slurry reacted with propane sultone there was added 34.4 grams of 2-chloroethyldiethylamine hydrochloride dissolved in 100 cc. of water and this mixture was allowed to stand at 78° F. for 17 hours. The pH was determined to be 11 at 74° F. and was adjusted to 7.0 by the addition of 6 N hydrochloric acid. This product was labelled 37.5–26.

The following evaluation of these products was then made:

TABLE 1

|  | 37.1–26 | 37.2–26 | 37.3–26 | 37.4–26 | 37.5–26 |
| --- | --- | --- | --- | --- | --- |
| Oven dry solids, percent | 88.86 | 86.27 | 89.11 | 88.98 | 90.35 |
| Ash percent, dry basis | 0.26 | 0.39 | 0.94 | 0.95 | 00.48 |
| Nitrogen percent, dry basis | 0.05 | 0.05 | 0.29 | 0.04 | 0.27 |
| Scott 0.37, AGU/50/sec | 63.8/50/105 | 65.7/50/38 | 63.7/50/42 | 63.7/50/32 | 62.8/50/37 |
| pH Scott paste | 7.3 | 8.0 | 7.8 | 7.9 | 7.3 |
| N/100 AGU | 0.51 | 0.45 | 3.38 | 0.35 | 3.08 |
| Scott visc | 0.35 AGU/50/100 | 0.4 AGU/50/60 | 0.4 AGU/50/59 | 0.4 AGU/50/48 | 0.4 AGU/50/51 |
| Cold Scott paste | Stiff gel | Stiff gel | Soft gel | Soft gel | Fluid |
| Sulfur percent, dry basis | 0.009 | 0.006 | 0.003 | 0.24 | 0.28 |
| S/100 AGU | 0.08 | 0.05 | 0.03 | 2.0 | 2.0 |

In Table 1, the Scott 0.35 AGU/50/sec. entry is a standard viscosity determination. The first entry is the grams of the respective starch product needed to give 0.35 AGU, the second entry indicates the volume in cc. of the starch product used in the viscosity determination, the third entry is the number of seconds required for flow of the 50 cc. of starch product under the Scott viscosity determination. The S/100 AGU indicates moles of sulfur per 100 anhydroglucose units.

The first four columns of the Table 1 refer to products that are outside of the scope of the invention. Only the fifth column covers a product within the scope of the invention. It will be noted particularly that only in the fifth column was the cold Scott paste fluid. In the others, the products formed a soft gel or a stiff gel. This is an important factor in the utility of the products.

120 grams of product 37.5-26 was slurried in 1200 mls. distilled water. The pH was adjusted to 7.0 by adding 6 N hydrochloric acid and the slurry was divided into two equal portions, A and B. 100 cc. of A was filtered and air dried and labelled 37.5A-7.0. The pH of the remainder of A was adjusted to 6.5 with 6 N hydrochloric acid. 100 cc. was filtered, air dried and labelled 37.5A-6.5. Similarly, other 100 cc. portions of A were prepared, each having a pH decreasing by 0.5 pH unit.

The portion B was divided into parts each consisting of 100 cc. and a sufficient amount of 10% potassium hydroxide was added to raise the pH by steps of 0.5 unit. In each case the slurry was filtered and dried.

Portions of each product were then slurried with 0.001 N acid dye CI 42095 and basic dye CI 52015. The isoelectric point appeared to be at a pH of 6.0. Below 6.0 no dyeing occurred with the basic dye but dyeing did occur with the acid dye, and above 6.0 no dyeing occurred with the acid dye but it did occur with the basic dye.

In the foregoing example, the product 37.5-26 contains about two sulfur atoms per 100 AGU and three nitrogen atoms per 100 AGU which means that there are two acidic groups for every three amino groups.

EXAMPLE IV 5000 grams of dry No. 50 thin boiling regular corn starch (30.8 AGU) was slurried in 5 liters of water. To this was added 112 grams of calcium oxide in 1 liter of water. The resultant slurry was stirred and diluted with water to 11 liters. At 70° F. is had a pH of 11.9. It was divided into 5 equal portions each containing 1000 grams of starch (6.16 AGU) and 0.4 mole of calcium oxide.

To part one was added 24.4 grams (0.2 mole) propane sultone and after 4 hours at 72-74° F. there was added 0.2 mole of 2 - chloroethyldiethylamine hydrochloride in 100 cc. of water. The mixture was stirred and allowed to stand 18.5 hours at about 75° F. The pH was adjusted to 7.0 with 6 N hydrochloric acid. After 15 minutes the product was filtered, reslurried in 2 liters of water, filtered again, reslurried in 2 liters of water, filtered, reslurried in 1 liter of distilled water, filtered again and dried. This product was labelled 19.1.

The process used in preparing product 19.1 was repeated except that 0.16 mole (19.5 grams) of propane sultone was employed. This product was labelled 19.2.

The process used in preparing product 19.1 was repeated except that 0.12 mole of propane sultone was employed (14.65 grams). This product was labelled 19.3.

The process used in product 19.1 was repeated except that 0.08 mole of propane sultone was employed (9.75 grams). This product was labelled 19.4.

The process used in preparing product 19.1 was repeated except that 0.04 mole of propane sultone was used (4.88 grams). This product was labelled 19.5.

An evaluation of these products is given in Table 2.

TABLE 2

|  | 19.1 | 19.2 | 19.3 | 19.4 | 19.5 |
|---|---|---|---|---|---|
| Oven dry solids, percent | 84.05 | 79.59 | 88.66 | 89.53 | 91.36 |
| Ash percent, dry basis | 0.24 | 0.20 | 0.99 | 0.09 | 0.15 |
| Nitrogen percent, dry basis, N/100 AGU | 0.24-2.3 | 0.24-2.3 | 0.25-2.4 | 0.22-2.1 | 0.27-2.0 |
| Sulfur percent, dry basis, S/100 AGU | 0.33-2.8 | 0.27-2.3 | 0.14-1.2 | 0.10-0.9 | 0.06-0.6 |
| Scott 0.35, AGU/50/sec | 67.5/50/40 | 71.2/50/38 | 64.0/50/43 | 63.3/50/48 | 62.1/50/48 |
| Cold Scott paste (pH) | Fluid (7.1) | Soft (7.2) | Stiff (7.0) | Stiff (7.2) | Stiff (6.8) |
| Isoelectric pH range | 5.0-7.0 | 6.0-8.0 | 8.0-10.0 | 8.5-10.5 | 10.0 |

In Table 2 the numerical value after the percent of nitrogen in each column represents the number of basic groups per 100 AGU and the numerical value after the percent of sulfur in each column represents the number of acidic groups per 100 AGU. Thus, in product 19.1 there are 2.3 basic groups and 2.8 acidic groups. In the other products the number of basic groups is approximately the same but the number of acidic groups decreased. As a result, product 19.5 contains 2.6 basic groups and 0.5 acidic group per 100 AGU. It will be noted that the viscosity of the Scott cold paste increases as the number of acidic groups decreases. Also, the isoelectric pH range increases as the number of acidic groups decreases.

The various products prepared as above described were adjusted in pH and the viscosity and cold paste characteristics were observed. The product 19.1 at pH's 4 to 8 remained fluid. The product 19.2 at pH's 5 to 9 remained fluid. The product 19.3 at pH's from 7 to 1 remained fluid. The product 19.4 at pH's from 7.5 to 11 formed a soft gel. The product 19.5 at pH's from 8 to 11 formed a medium gel. Thus, a fluid product was obtained from a ratio of acidic to basic groups from about 0.5:1 to more than 1:1.

EXAMPLE V

The same procedure was used as in Example IV except that the relative proportion of propane sultone was kept constant and the amount of 2-chloroethyldiethylamine hydrochloride was varied. 5 products were prepared which were labelled 18.1, 18.2, 18.3, 18.4 and 18.5.

The evaluation of these products is shown in Table 3.

TABLE 3

|  | 18.1 | 19.2 | 19.3 | 18.4 | 18.5 |
|---|---|---|---|---|---|
| Oven dry solids, percent | 87.73 | 85.46 | 90.09 | 88.43 | 91.31 |
| Ash percent, dry basis | 0.25 | 0.30 | 0.42 | 0.83 | 0.62 |
| Nitrogen percent, dry basis | 0.27 | 0.22 | 0.17 | 0.136 | 0.08 |
| Sulfur percent, dry basis | 0.26 | 0.25 | 0.25 | 0.27 | 0.25 |
| Scott 0.35, AGU/50/sec | 64.6/50/40 | 66.3/50/37 | 62.9/50/36 | 64.1/50/35 | 62.1/50/37 |
| pH Scott paste | 7.0 | 7.5 | 7.3 | 7.7 | 7.9 |
| Cold Scott paste | Fluid | Fluid | Soft | Soft | Stiff |
| Isoelectric pH range | 5.5-7.5 | 4.0-6.0 | 2.0-3.0 | 1.5-2.5 | 1.0-2.0 |
| Sulfur/100 AGU | 2.3 | 2.1 | 2.2 | 2.3 | 2.2 |
| Nitrogen/100 AGU | 2.7 | 2.1 | 1.8 | 1.4 | 0.93 |

It will be noted that the ratio of acidic groups to basic groups in these products varies from slightly less than 1:1 to more than 2:1. Products 18.1 and 18.2 formed fluid cold paste.

Samples of modifications of these products were prepared by adjusting the pH and it was found that product 18.1 had a fluid cold paste at a pH of 5.1 to 7.6. Product 18.2 had a fluid cold paste at a pH of 4.4 to 6.5. Products 18.3 had a fluid cold paste at a pH of 3.1 to 5.0. Product 18.4 had a fluid cold paste at a pH of 3.6 and 4.7. Product 18.5 had a fluid cold paste at a pH of 3.1 and 4.5. It was observed that the isoelectric pH goes down as the basic groups decrease.

EXAMPLE VI

The process was carried out as in Examples IV and V except that the reaction time between the starch and the propane sultone but before the addition of the amine was omitted. It was found that this reaction time was unnecessary. A higher sulfur content resulted when the two reactants were added at about the same time.

EXAMPLE VII 5000 grams of regular corn starch (30.8 AGU) was slurried in 6 liters of water to which had previously been added 168 grams of calcium oxide. The slurry was diluted to 10 liters with water. ⅕ of the slurry was then mixed with 51.6 grams (0.3 mole) of 2-chloroethyldiethylamine hydrochloride which had previously been dissolved in 0.6 mole of water, together with 0.3 mole of propane sultone at 86° F. The amine hydrochloride and the propane sultone formed a clear solution in water which was stirred into the starch slurry at about 69° F. The mixture was then reacted for 18 hours at a temperature of about 80° F. At this point the slurry had a pH of 11.0. The pH was then adjusted to 7.0 by adding 1.0 N hyrochloric acid. The product was filtered, reslurried in 2 liters of water, filter, reslurried in 2 liters of water, filtered, reslurried in 1 liter of distilled water, filtered and dried. This product had an isoelectric pH range from 6.0 to 7.5. It contained 3.9 nitrogen atoms per 100 AGU and 1.9 sulfur atoms per 100 AGU. The coid Scott paste was fluid.

EXAMPLE VIII

This example relates to a different kind of amphoteric starch from the products described in Examples I to VII in that the basic groups are introduced by adding a cyanamide compound.

5000 grams of No. 50 thin boiling regular corn starch (30.8 AGU) was slurried in 5 liters of water and diluted with water to 10,000 cc. After 500 cc. of the slurry had been removed, the remainder of the slurry was reacted with 61.07 grams (0.5 mole) of propane sultone at 82–92° F. for 4 hours. 250 cc. of this slurry was removed and the remainder was reacted with 400 cc. (210 grams, 5 moles) of a 50% solution of hydrogen cyanamide ($H_2NCN$) in water for 17 hours at 76–78° F. The pH was adjusted to 1.0 with 6 N hydrochloric acid, and the product was filtered and reslurried with 10 liters of water three times. Thereafter, 50 grams of aluminum sulfate in 100 cc. of water was stirred into the slurry and the slurry was divided into five equal parts. The first part, labelled 44.1, was filtered and dried. The second part, labelled 44.1, was adjusted to a pH of 3.0 and filtered and dried. The third part was labelled 44.3, was adjusted to a pH of 3.6 and filtered and dried. The fourth part, labelled 44.4, was adjusted to a pH of 4.5, filtered and dried. The fifth part, labelled 44.5, was adjusted to a pH of 5 and filtered and dried. The fifth part was found to be very viscous. The other four parts all gave fluid cold Scott paste. Controls prepared without the addition of the sultone and the cyanamide all gave cold Scott pastes which were stiff gels.

The products 44.1, 44.2, 44.3, 44.4 were all suitable in sizing textile fibers in the manner previously described. These products all contained about 0.9% nitrogen as compared with 0.04 to 0.06% nitrogen in the original starch. The products also contained sulfur in the form of sulfonic acid groups.

EXAMPLE IX 5000 grams regular corn starch was slurried in eight liters of water and diluted to 12 liters with water. 75 grams of $Ca(OH)_2$ in one liter of water was added to the starch slurry. Then 75 grams of 2-chloroethyldiethylamine hydrochloride dissolved in 100 cc. of water was stirred into the slurry. Thereafter, 25 grams of sodium chloroacetate in 100 cc. of water was stirred into the slurry. The mixture was held at a temperature of 120–124° F. for 16 hours. The pH at the end of this period was 11.1. It was then adjusted to pH 3.5 by adding 6 N HCl. The product was filtered, reslurried in 20 liters of water, filtered, reslurried in 20 liters of water, filtered, reslurried in 9 liters of distilled water, and filtered to a dry state.

The product had a nitrogen content of 0.19% and an isoelectric pH of 8.5.

EXAMPLE X

The procedure was the same as in Example IX except that the corn starch was slurried in five liters of water and diluted to 10 liters with water. The temperature was adjusted to 123° F. and 150 grams of $Ca(OH)_2$ in one liter of water was added. Then 150 grams of 2-chloroethyldiethylamine hydrochloride in 200 cc. of water was stirred into the slurry. Thereafter 50 grams of sodium chloroacetate in 200 cc. of water was stirred in and after 18 hours at 120° to 124° F. the reaction was stopped by adding 460 cc. of 6 N HCl which reduced the pH of the slurry from 10.9 to 3.5. The product was recovered as described in Example IX.

The product had an isoelectric pH of 9.5, and an NCV viscosity at 0.10 AGU of 13 seconds.

EXAMPLE XI

The procedure was the same as in Example X except that the quantity of sodium chloroacetate was increased to 150 grams and the time of reaction was increased to 22 hours.

The product had an isoelectric point of 7.5 and an NCV viscosity at 0.15 AGU of 58 seconds.

The products of Examples X and XI afforded good pigment retention in paper made from wood pulp fiber dispersions.

EXAMPLE XII 5000 grams of unmodified corn starch was slurried in 6 liters of water and diluted with water to 10 liters. 150 grams of sodium hydroxide and 500 grams of sodium chloride in 3 liters of water were cooled to room temperature and stirred into the slurry. The temperature of the slurry was raised to 110° F. and 150 grams of sodium chloroacetate in 500 cc. of water was stirred into the slurry and allowed to react for 48 hours at 125° F. One half of this slurry was adjusted to a pH of 3.5 with 6 N HCl, filtered, reslurried in 10 liters of water twice, then 5 liters of water, filtered and dried and labelled 31.5A–38.

To the other half of the slurry there was added 75 grams of 4-chloro-2-butenyltrimethyl ammonium chloride dissolved in 100 cc. of water. The temperature of the slurry was raised to 124° F. and after a period of 24 hours reaction time at this temperature the reaction was stopped by adjusting the pH of 3.5 with 6 N HCl and the product was recovered in the same manner as in the case of 31.5A–38. This product was labelled 31.5AB–38.

The properties of the two products were determined as shown in the following table:

TABLE 4

| | Unmodified corn starch | 31.5A-38 | 31.5AB-38 |
|---|---|---|---|
| Moisture percent | 7.96 | 7.69 | 7.72 |
| Ash percent, dry basis | 0.07 | 0.22 | 0.03 |
| Nitrogen percent, dry basis | 0.07 | 0.03 | 0.21 |
| Brabender 6%, dry basis (IT) °C | 84 | 70 | 68.5 |
| Maximum visc., Brabender Units | 290.0 | 920.0 | 660.0 |
| Viscosity after 20 minutes at 92° C | 290.0 | 340.0 | 520.0 |
| Viscosity after 15 minutes at 25° C | 540.0 | 980.0 | 1,020.0 |
| Isoelectric pH | Nonionic | Anionic | 4.3 |

It will be observed that the unmodified corn starch was nonionic, the product labelled 31.5A-38 was anionic and the product labelled 31.5AB-38 was amphoteric and had an isoelectric pH of 4.3.

EXAMPLE XIII 5000 grams of No. 50 thin boiling corn starch was slurried in 5 liters of water, diluted with water to 10 liters and heated to 105° F. 150 grams of calcium hydroxide in 1 liter of water was stirred into the mixture, the temperature rising to 110° F. 50 grams of sodium chloroacetate in 200 cc. of water was stirred into the slurry and was allowed to react for 23 hours at 123° F. At this point 1500 cc. of slurry was removed, the pH adjusted to 6.5 by adding 65 cc. of 6 N HCl, the solids filtered, reslurried in 2 liters of water, filtered, reslurried in 2 liters of water, filtered, reslurried in 1 liter of distilled water and the pH adjusted to 6.5, then filtered and dried and labelled 38.1A-38.

The remainder of the slurry was mixed with 135 grams of 4-chloro-2-butenyltrimethylammonium chloride in 200 cc. of water and allowed to react at 120–121° F. for 23 hours. At the end of this period the pH was adjusted to 3.5 with 339 cc. of 6 N HCl. The solids were then filtered, reslurried in 20 liters of water, filtered again, reslurried in 20 liters of water, filtered and reslurried in 9 liters of distilled water, the pH adjusted to 3.5 and then filtered and dried. This product was labelled 38.1AB-38.

A blank was also run by slurrying 1000 grams of No. 50 thin boiling corn starch in 2 liters of distilled water, filtering, reslurrying in 2 liters of distilled water, filtering, reslurrying in 2 liters of distilled water, and finally filtering and drying. This was labelled 38-Blank-38.

The product labelled 38.1A-38 was anionic. The blank labelled 38-Blank-38 was nonionic. The product labelled 38-1A-38 was amphoteric and had an isoelectric pH of 8.7.

EXAMPLE XIV

The procedure was the same as in Example XIII except that 50 grams of propane sultone was added to the slurry of thin boiling starch in water containing calcium hydroxide instead of the sodium chloroacetate. The propane sultone was allowed to react for 21 hours at 123° F. Then 135 grams of 4-chloro-2-butenyltrimethyl ammonium chloride was stirred into the slurry and the reaction allowed to proceed for 24 hours at 120–122° F. The reaction was stopped by adding 318 cc. of 6 N HCl and the product was recovered in the manner previously described in Example XIII. This product contained 0.21% nitrogen on a dry basis. The initial temperature of gelatinization was 148.1° F. and the isoelectric pH was 9.3.

EXAMPLE XV 5000 grams of No. 50 thin boiling corn starch was slurried in 5 liters of water, diluted with water to 10 liters and heated to 113° F. 150 grams of calcium hydroxide slurried in one liter of water was stirred into the mixture, the temperature rising to 116° F. 50 grams of sodium chloroacetate in 200 cc. of water was stirred into the slurry and was allowed to react for 21 hours at 123° F. At this point 1500 cc. of slurry was removed, the pH adjusted to 0.5 with 206 cc. of 6 N HCl. After 0.5 hour were filtered, reslurried in 2 liters of water, filtered again, and reslurried in 2 liters of water, and filtered a third time and reslurried in 2 liters of water. The pH of the slurry was then adjusted to 9.6 by adding 49 cc. of a 50% ammonia solution and the slurry was held at a temperature of 81° F. for 1 hour. The solids were then filtered, reslurried in 2 liters of distilled water, filtered again and dried. This product was labelled 41.1A-38.

The remainder of the slurry was mixed with 135 grams of 2-hydroxy-3-chloropropyltrimethylamine chloride and the mixture was allowed to react at a temperature of 120–124° F. for 24 hours. At the end of this period the pH was adjusted to 3.5 by adding 358 cc. of 6 N HCl. The solids were filtered, reslurried in 20 liters of water, filtered again, reslurried in 20 liters of water, filtered a third time, reslurried in 9 liters of distilled water and filtered and dried. This product was labelled 41.1AB-38.

Instead of using sodium chloroacetate, 50 grams of propane sultone was reacted with the starch in the first step of the process to produce a product which was labelled 41.2A-38. This product was then reacted with 2 hydroxy-3-chloropropyltrimethylamine chloride in the manner previously described to produce a product containing sulfonate groups and quaternary amine salt groups which was labelled 41.2AB-38.

The product labelled 41.1AB-38 which contained carboxylate groups and quaternary amine salt groups had an isoelectric pH of 6.0. The product labelled 41.2AB-38 had an isoelectric pH of 7.5. Both of these products are useful in the treatment of textiles and especially in the sizing of textile fibers. Their initial temperatures of gelatinization are lower than the initial temperature of gelatinization of the unsubstituted starch. The viscosities of the gelatinized substituted starches are also lower than the viscosity of the unsubstituted starch taken at intervals when the starches are cooked at a given temperature over a period of 35 minutes. The viscosities of the amphoteric starches were generally lower than those of the anionic starches 41.1A and 41.2A except that after a period of 20 minutes cooking all of the anionic and amphoteric starches attained a minimum viscosity at about the same point.

EXAMPLE XVI

In a similar manner the process of Example XV was carried out using unmodified corn starch instead of the No. 50 thin boiling starch.

EXAMPLE XVII 5000 grams of No. 50 thin boiling corn starch was slurried in 5 liters of water, diluted with water to 10 liters and heated to 89° F. 144 grams (2 moles) of propiolactone was added to the slurry and the mixture was kept at 87° F. for 23 hours. At the end of that time the reaction mixture was divided into 5 equal parts.

To the first part 37 grams of calcium hydroxide in 100 cc. of water was added and to the resultant slurry there was added 188 grams of 2-hydroxy-3-chloropropyltrimethylamine chloride in 200 cc. of water. After 23 hours at a temperature of 83° F. the pH was adjusted by adding 6 N HCl. The solids were then filtered and reslurried in 2 liters of water, filtered again, reslurried in 2 liters of water, filtered, reslurried in one liter of distilled water, the pH adjusted to 3.5 and filtered and dried. This product was labelled 48.1.

Another portion of the slurry resulting from the reaction of the starch with the propiolactone was reacted with ¾ as much (0.75 mole) of 2-hydroxy-3-chloropropyltrimethylamine chloride as was used in making the product labelled 48.1. Otherwise, the reaction was carried out in the same manner and the product was recovered and labelled 48.2.

Another product was made in the same manner as 48.1 and 48.2 except that ½ as much 2-hydroxy-3-chloropropyltrimethylamine chloride was used as had been employed in making 48.1. The reaction was carried out in the same manner and the product was recovered in the same manner and labelled 48.3.

Another product was prepared in the manner previously described except that ¼ as much 2-hydroxy-3-chloropropyltrimethylamine chloride was used as had been used in making the product 48.2. This product was labelled 48.4 and was recovered in the same manner.

The fifth portion of the product obtained by reacting the starch with propiolactone was recovered and used as a blank. This product was labelled 48.5.

The products labelled 48.1 and 48.2 each had isoelectric pH's at 8.5. The product labelled 48.3 had an isoelectric pH at 9. The product labelled 48.4 had an isoelectric pH of 9.5. The blank had no isoelectric pH.

In this example the reaction of the starch with the propiolactone introduces a carboxypropylether substituent and the reaction with the 3-chloro-2-hydroxypropyltrimethylamine chloride introduces a quaternary ammonium salt substituent.

EXAMPLE XVIII

Using the general procedures previously described, corn starch was reacted with 2-chloroethyldiethylamine hydrochloride and succinic anhydride to produce an isoelectric starch having a pH of 4.5. When chlorendic anhydride was substituted for succinic anhydride the pH of the amphoteric starch was also 4.5. When adipic acid in acetic anhydride was used the amphoteric starch had an isoelectric pH of 9.5.

EXAMPLE XIX 5000 grams of amylose 7 was slurried in 12 liters of water at 94° F. 150 grams of calcium hydroxide in one liter of water was stirred into the slurry. 150 grams of 2-chloroethyldiethylamine hydrochloride in 200 cc. of water was stirred into the slurry and 300 grams of acrylonitrile was added. After 6 hours at 79–91° F. the reaction mixture was divided into 5 equal parts.

To the first part was added 125 cc. of 35% hydrogen peroxide and the mixture was held at a temperature of 77–81° F. for 17 hours. The pH was then adjusted to 3.5 with 6 N HCl. The solids were filtered, reslurried in 2 liters of water, filtered, reslurried in 2 liters of water, filtered, reslurried in one liter of distilled water, the pH adjusted to 3.5, filtered and dried. This product was labelled 6.1.

The procedure with the second part was the same except that 75 cc. of 35% of hydrogen peroxide was used and the product was labelled 6.2.

The procedure with the third part was the same except that 50 cc. of 35% hydrogen peroxide was used and the product was labelled 6.3.

The procedure with the fourth part was the same except that 25 cc. of 35% hydrogen peroxide was used and the product was labelled 6.4.

The solids were recovered from the fifth part without treatment with hydrogen peroxide and used as a blank.

The product labelled 6.1 had an isoelectric pH of 5.8. The product labelled 6.2 had an isoelectric pH of 8.0. The product labelled 6.3 had an isoelectric pH of 9. The product labelled 6.4 had an isoelectric pH of 9.5. The product labelled 6.5 had an isoelectric pH of 9.5.

The invention provides new and useful amphoteric starches which can be employed for a wide variety of purposes. As previously indicated, these starches are characterized by containing both acid and basic groups which are substituted on one or more reactive positions of the starch molecule. The substitution of these groups reduces the gelatinization range of the starch. Unmodified corn starch gelatinizes at 143.6–161.6° F. (62–72° C.). Granules of corn starch can be washed and freed of debris below about 143.6° F. (62° C.). The amount of substitution preferably for practical reasons should not reduce the gelatinization range below about 118.4° F. (48° C.).

For most practical purposes, therefore, the maximum amount of substitution will not exceed ten basic and acidic groups per 100 anhydroglucose units. In some cases, however, it may be desirable to have greater substitution (usually not more than 16) for preparing special types of products. In general, the ratio of acidic groups to basic groups is preferably within the range of 1:3 to 3:1, and a ratio in which basic groups predominate is usually best, preferably a ratio of basic to acidic groups of about 2:1.

It will be observed that in Examples I to VII, the basic groups contain nitrogen in the form of an amine. In Example VIII the basic nitrogen group is a cyanamide (NCN) group. In all of the examples the acidic groups are sulfonic acid or sulfonate groups or carboxylic or carboxylate groups but other types of acidic groups can be substituted.

While it is possible to carry out the reaction between the starch and the anionic and cationic etherifying reagents in the presence of an alkali metal hydroxide such as, for example, sodium hydroxide or potassium hydroxide, it is preferable to use an alkaline earth metal hydroxide such as, for example, calcium oxide, strontium hydroxide, or barium hydroxide, due to increased reaction efficiency. For example, in one series of reactions with the sultone, the reaction efficiency with sodium hydroxide was 24.6%, with calcium oxide 36%, with strontium hydroxide 32.8%, with barium hydroxide 31.3%, with magnesium oxide 10.9%, with potassium carbonate 6.3% and with sodium carbonate 4.7%.

In the sizing of textile fibers a typical sizing composition can be prepared by mixing 100 pounds of an amphoteric starch prepared in accordance with this invention with 200 gallons of water, preferably with the addition of five pounds of petroleum wax. The thread or yarn to be sized, for example, a thread or yarn containing 65% polyester fiber (Dacron), and 5% cotton fibers, can be sized with this composition at 180° F. It will be recognized that at a temperature of 180° F., the amphoteric starch in the aqueous dispersion will be gelatinized.

In using this sizing composition, the number of yards of woven material between changes of loom stops can be increased. After weaving the sizing material can be removed by treatment with enzymes in the normal manner or by washing with a detergent water.

The compositions of the invention can also be employed in other uses, for example, in the finishing of textiles, in dyeing textiles and paper, in the sizing of paper, in the application of pigments or coatings to cloth and paper, as a coagulating agent in the separation of finely divided mineral particles from ores or water, in sedimentation, and for a wide variety of other purposes. A special use of amphoteric starches such as those described in the examples in addition to the wet end of a paper making machine of the Fourdrinier type to produce paper having enhanced resistance to ink penetration and enhanced oil resistance.

The term "high amylose starch" when used herein refers to any starch or starch fraction containing at least about 50% by weight amylose. Exemplary thereof are "Nepol" amylose (the amylose fraction of corn starch); "Superlose" (the amylose fraction of potato starch); "Amylomaize" or "Amylon" (high amylosic corn starch with about 54% amylose); and Amylomaize VIII (high amylose corn starch containing about 73.3% amylose). Amylomaize VIII with an amylose content of around 85% can also be used. The starch can be of any origin, for examle, corn, wheat, potato, waxy corn, tapioca, sago or rice.

It will be apparent from the foregoing description that the cationic groups which are introduced into the starch molecule are amino radicals which are preferably tertiary amino groups or quaternary amino groups. The introduction of the anionic groups into the starch molecule can take place with the elimination of a hydrogen halide, for example, where sodium chloroacetate is employed the reaction occurs with the elimination of hydrogen chloride. In the case of propane sultone the reaction takes place with the opening of the sultone ring. In any case, the conditions used should be non-gelatinizing with respect to the starch.

The invention is hereby claimed as follows:

1. A process of sizing textile fibers which comprises coating such fibers with a gelatinized aqueous dispersion of an amphoteric starch, said amphoteric starch containing both anionic groups and cationic groups as substituents in sufficient amounts to give the starch an isoelectric pH but not exceeding a total of 16 anionic and cationic groups per 100 anhydroglucose units, said anionic groups and said cationic groups being present in an amount of at least 0.5 such groups per 100 anhydroglucose units, the ratio of said anionic groups to said cationic groups being within the range of 1:3 to 3:1, and said textile fibers being from the group consisting of cellulose fibers, cellulose acetate fibers, acrylic fibers, polyester fibers, polyamide fibers, silk, regenerated cellulose, wool and mixtures of said fibers.

2. A process as claimed in claim 1 in which the anionic groups are sulfonic or sulfonate and the cationic groups are from the group consisting of cyanamide, tertiary amino, tertiary amine salt, quaternary amino and quaternary amine salt.

3. A process as claimed in claim 1 in which the anionic groups are carboxylic or carboxylate and the cationic groups are from the group consisting of cyanamide, tertiary amino, tertiary amine salt, quaternary amino and quaternary amine salt.

4. A process as claimed in claim 1 in which the anionic groups are phosphate or phosphonate and the cationic groups are from the group consisting of cyanamide, tertiary amino, tertiary amine salt, quaternary amino and quaternary amine salt.

5. A process as claimed in claim 1 in which said amphoteric starch as the formula $$(An\!-\!R_1\!-\!O)_m\!-\!X\!-\!(O\!-\!R\!-\!Cat)_n$$

wherein X is starch, An is an anionic group, Cat is a cationic group, R and $R_1$ are divalent acyclic hydrocarbon or hydroxyhydrocarbon groups having 1 to 6 carbon atoms, $m$ and $n$ are each at least 0.5 per 100 anhydroglucose units and the total of $m+n$ does not exceed 16 per 100 anhydroglucose units, 6. A process as claimed in claim 1 in which the textile fibers are mixed polyester-cotton fibers.

7. A textile material containing a coating of amphoteric starch, said starch containing both anionic groups and cationic groups each in proportions of at least 0.5 such groups per 100 anhydroglucose units and the total number of anionic groups and cationic groups not exceeding 16 per 100 anhydroglucose units, the ratio of said cationic groups to said anionic groups substituted in said starch being within the range of 1:3 to 3:1 and said textile material containing textile fibers from the group consisting of cellulose fibers, cellulose acetate fibers, acrylic fibers, polyester fibers, polyamide fibers, silk, regenerated cellulose, wool and mixtures of said fibers.

8. A textile material as claimed in claim 7 comprising both polyester fibers and cotton fibers.

References Cited

UNITED STATES PATENTS

| 3,051,691 | 8/1962 | Elizer et al. | 117—139.5 X |
| 3,051,699 | 8/1962 | Elizer et al. | 117—139.5 X |
| 3,051,700 | 8/1962 | Elizer et al. | 117—139.5 X |
| 3,459,632 | 8/1969 | Caldwell et al. | 162—175 |
| 3,467,647 | 9/1969 | Benninga | 117—156 X |
| 3,144,351 | 8/1964 | Anderson | 117—138.8 |
| 3,376,623 | 4/1968 | Katzbeck et al. | 117—139.5 X |

WILLIAM D. MARTIN, Primary Examiner

T. G. DAVIS, Assistant Examiner

U.S. Cl. X.R.

117—138.8 F, 138.8 N, 138.8 UA, 143 R, 144

PO-1050
(5/69)

UNITED STATES PATENT OFFICE
CERTIFICATE OF CORRECTION

Patent No. 3,676,205                    Dated July 11, 1972

Inventor(s) Lee H. Elizer

It is certified that error appears in the above-identified patent and that said Letters Patent are hereby corrected as shown below:

Column 2, line 41, "cylcloalk-" should read -- cycloali- --.

Column 5, line 64, "pH and 6.5." should read -- pH 4 and 6.5. --.

Column 8, Table 2, under "19.5", "0.27-2.0" should read -- 0.27-2.6 --; "0.06-0.6" should read -- 0.06-0.5 --; Table 3, "19.2" should read -- 18.2 --; "19.3" should read -- 18.3 --.

Column 9, line 8, "Products" should read -- Product --; line 39, "filter" should read -- filtered --; line 66, "44.1, was adjusted" should read -- 44.2, was adjusted --.

Column 12, line 1, "0.5 hour were filtered" should read -- 0.5 hour the solids were filtered --.

Column 14, line 69, "examle" should read -- example --.

Signed and sealed this 6th day of March 1973.

(SEAL)
Attest:

EDWARD M. FLETCHER, JR.                 ROBERT GOTTSCHALK
Attesting Officer                        Commissioner of Patents